United States Patent
Kusaki et al.

[11] Patent Number: 5,732,073
[45] Date of Patent: Mar. 24, 1998

[54] SLOTS ASSIGNMENT METHOD FOR CONTROL CHANNEL SIGNAL IN MOBILE TELECOMMUNICATION SYSTEM AND BASE STATION EMPLOYING THE SLOTS ASSIGNMENT METHOD

[75] Inventors: Tsutomu Kusaki; Yasushi Shiina; Takeshi Maki, all of Yokohama, Japan

[73] Assignee: Hitachi, Ltd., Tokyo, Japan

[21] Appl. No.: 550,048

[22] Filed: Oct. 30, 1995

[30] Foreign Application Priority Data

Nov. 1, 1994 [JP] Japan .................. 6-268553

[51] Int. Cl.$^6$ .................. H04Q 7/36; H04Q 11/04
[52] U.S. Cl. .................. 370/280; 370/337; 370/442
[58] Field of Search .................. 370/280, 294, 370/321, 330, 336, 337, 345, 347, 442, 478

[56] References Cited

U.S. PATENT DOCUMENTS 5,229,995  7/1993  Strawczynski et al. .......... 370/280
5,444,696  8/1995  Petranovich .................... 370/280

FOREIGN PATENT DOCUMENTS 4150116A  5/1992  Japan .
654363A   2/1994  Japan .

*Primary Examiner*—Melvin Marcelo
*Attorney, Agent, or Firm*—Kenyon & Kenyon

[57] ABSTRACT

A slots assignment method for a control channel signal in a mobile telecommunication system employing a time division multiple access/time division duplex (TDMA-TDD) system having a plurality of base stations each having at least one mobile station. Each of the base stations detects a control-channel signal transmitted from other base stations and a control-channel signal transmitted from the mobile station throughout a plurality of multiple frame periods, discriminates down-link control-channel slots from up-link control-channel slots being used by other base stations, selects, as optimum down-link control-channel slot candidates, ones of idle slots of idle slot blocks other than the down and up-link control-channel slots being used by other base stations with use of a predetermined evaluation function, and assigns one of the selected idle slots as a down-link control-channel slot of its own base station.

8 Claims, 8 Drawing Sheets

SLOTS ASSIGNMENT METHOD FOR CONTROL CHANNEL SIGNAL IN MOBILE TELECOMMUNICATION SYSTEM AND BASE STATION EMPLOYING THE SLOTS ASSIGNMENT METHOD

BACKGROUND OF THE INVENTION

The present invention relates to a mobile telecommunication system and more particularly, to a method for assigning time slots for transmission and reception of a control channel signal in radio zones of a mobile telecommunication system of a time division multiple access/time division duplex (TDMA-TDD) type and also to a base station for use to embody the method.

The mobile telecommunication system of the TDMA-TDD type is designed so that a multiple frame is made up of a plurality of frames each divided into a plurality of time slots, each base station selects an idle time slot of the multiple frame as a slot for transmission of the control-channel signal to send control-channel information to the associated mobile station at intervals of a multiple frame period.

Figure 1:
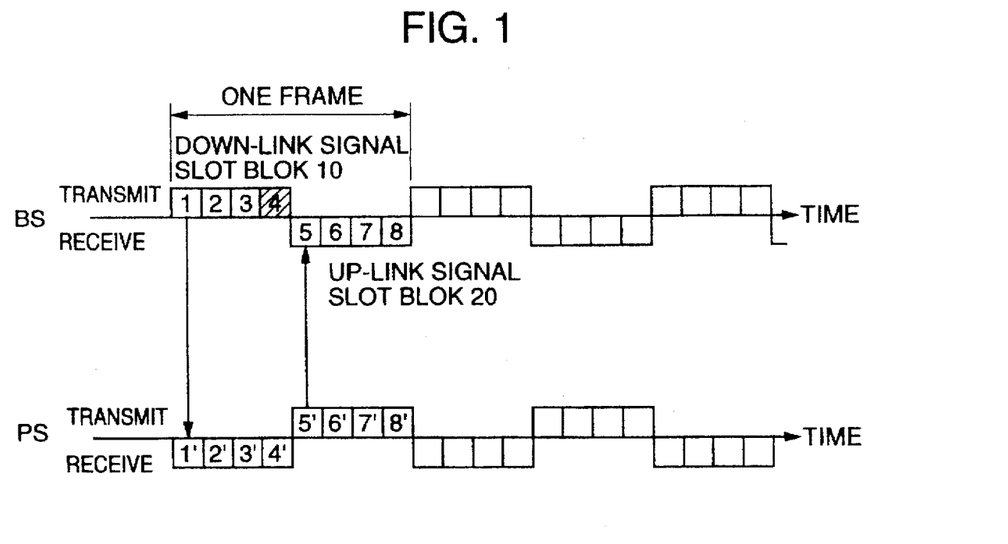
FIG. 1 is a diagram for explaining TDMA-TDD communication timing.

FIG. 1 is a timing chart showing a relationship of usual transmission and reception between a base station (BS) and a mobile or personal station (PS). In FIG. 1, a block of up-link signal time slots and a block of down-link signal time slots have 4 slots respectively.

The time slots of each frame are divided into a block of down-link signal (for communication from the base station to the mobile station) slots 10 (down-link signal slot block 10) and a block of up-link signal (for communication from the mobile station to the base station) slots 20 (up-link signal slot block 20), and the aforementioned slot for transmission of the control-channel signal directed to the mobile station (which slot will be referred to as the down-link control-channel slot, hereinafter) is selected from the down-link signal slots of the block of a frame (for example, a time slot 4 in FIG. 1 is selected). The transmission of the control-channel signal from the mobile station to the base station is carried out at one (which will be referred to as the up-link control-channel slot, hereinafter) of the up-link signal slots of each frame having a corresponding positional relationship with the above down-link control-channel slot. e.g., located as shifted by a half frame from the down-link control-channel slot. For example, when the time slot 4 in FIG. 1 is used as the down-link control-channel signal slot, a time slot 8 shifted by a half frame from the time slot 4 is used as the up-link control-channel slot. The remaining slots (time slots 1, 2, 3, 5, 6 and 7 in FIG. 1) of the up- and down-link signal slot blocks of each frame other than the up- and down-link control-channel signal slots are used as slots for communication of data information between the base station and mobile station.

Each base station transmits the control-channel signal at intervals of the multiple frame period with use of a signal carrier of an identical frequency commonly used by the other base stations and also with use of the down-link control-channel slot of the specific frame selected by its own base station. With respect to the frames of each multiple frame other than the specific frame, ones of the down-link signal slots located to correspond to the down-link control-channel slot, e.g., located as shifted by one frame are not effectively used. Each base station assigns specific up- and down-link traffic-channel slots of each frame to each of the mobile stations under the jurisdiction of the base station and assigns a frequency to one selected from a plurality of predetermined channels. Accordingly, each mobile station communicates with the base station and another mobile station via the base station at intervals of each of the frames of the multiple frame with use of the traffic channel slots specified by the base station. In this case, it becomes important how each base station selects idle control-channel slots.

Conventional one of methods for assigning slots in radio zones of the mobile telecommunication system of such a TDMA-TDD type is disclosed, e.g., in JP-A-6-54363 entitled "Method for Starting Mobile Telecommunication System" (prior art 1).

In the above system, when it is desired for each base station to start the system, the base station sequentially detects the control-channel signal carrier of the down-link signal slots. Each base station the timing of no detection of the control-channel signal carrier as idle transmission timing (idle slot), selects the idle timing as the transmission timing of the down-link control-channel signal of its own base station, and starts the transmission of the control-channel signal carrier with one period of a product (t×N) of a time t of the TDMA frame corresponding to one frame and the number N of base stations.

The above prior art system is designed so that first one of time slots of each frame is assigned as the down-link control-channel slot and, when each base station detects the control-channel signal carrier transmitted from another base station at the first slot of the first frame, the base station detects the control-channel signal carrier at the timing of the first slots of the subsequent frames. In other words, in order to detect an idle frame, the above system is required to establish synchronism between the base stations.

Another example of prior art methods for assigning slots in radio zones is also disclosed, e.g., in JP-A-4-150116 entitled "Time Division Duplex Radio Communication System" (prior art 2).

The above system is designed so that, in a mobile telecommunication system of a multi channel access (MCA) type wherein one carrier frequency is applied to a TDMA frame having n time slots (channels) in a radio zone and the radio channels corresponding to mobile stations (cordless telephone sets) are unfixedly assigned to idle time slots, each base station can assign the idle slots to the respective mobile stations while preventing radio interference with the other base stations and also without establishment of frame synchronization with other base stations.

More specifically, in the case where a base station judges the i-th channel of the TDMA frame as an idle channel and assigns the channel to a mobile station, when the frame is asynchronous to the frames being used by other base stations, the slot judged as idle one might be overlapped with signals of other base stations on a time axis. To avoid this, in the above system, each base station detects a plurality of idle channels through a predetermined procedure and then measures a time interval with the in-use channel located after or before each idle channel on the time axis. Thus, when one of the idle channels having the maximum time interval with the in-use channel after or before each idle channel is selected as a traffic channel, interference between the time slots can be suppressed to a minimum even when the frame is somewhat shifted from the frames of other base stations on the time axis.

The system of the above prior art 1 is intended for each base station to establish synchronoushess of frames between the base stations, and thus requires special control for the purpose of establishing the frame synchronoushess between the base stations.

Further, the system of the above prior art 2 is designed so that channels (slots) of one frame corresponding to no detection of a signal carrier of a specific frequency for use in communication between the base station and mobile station are all judged as idle channels and ones of the judged idle channels to be used are selected on the basis of a positional relationship with the in-use channels after or before each idle channel. Therefore, in such a system that two types of up- and down-link control-channel slots exist as in the aforementioned mobile telecommunication system of the TDMA-TDD type using the multiple frame, the base stations in operation function to transmit the control-channel signal at intervals of a multiple frame period the use of one down-link control-channel slot of the respective specific frames while the respective mobile stations output the control-channel signal to the up-link control-channel slot of any one frame on a nonregular basis as necessary; there occurs a problem that, in the case where no frame synchronousness is established between the base stations, even when a newly started base station can detect the signal carrier of the specific frequency corresponding to the above control-channel signal and can discriminate some of the slots from the control-channel slot being used by other base stations, it is impossible for the base station to judge these slots belonged to which of the up- and down-link slot blocks because the up- and down-link signals use the same frequency.

Accordingly, when all slots at which the control-channel signal carrier was detected are not selected as selection objects and when it is desired to select up- and down-link control-channel slots from the remaining slots to be used in its own base station according to the method of the prior art 2; there occurs a problem that the selection flexibility is remarkably restricted and assignment of the optimum control-channel slots cannot be realized.

In the prior art 2, further, no consideration is paid when an exception slot to be excluded from the assignment objects is present in idle slots or when a slot usable as the assignment object is present in the in-use slots at which the specific signal carrier was detected.

SUMMARY OF THE INVENTION

The present invention provides mobile telecommunication system of a multiple frame type in which, even when a base station fails to establish frame synchronousness with another base station, each base station can assign an optimum control-channel slot and also to provide a base station for use in the mobile telecommunication system.

The present invention is to provide a slots assignment method for a control channel signal in a mobile telecommunication system of a TDMA-TDD type using multiple frames each having a plurality of frames including a block of down-link signal slots and a block of up-link signal slots, in which each base station can transmit control-channel information to a mobile station under the jurisdiction of the base station while preventing any interference with other base stations with use of a control-channel frequency common to the other base stations.

The present invention provides a slots assignment method for a control channel signal in which each base station analyzes a reception status of a control-channel signal carrier and discriminates whether a slot being used by other base stations is a down-link control-channel slot for periodic output of a control-channel signal or an up-link control-channel slot for no periodic output of the control-channel signal to allow selection of an optimum control-channel slot, and also to provide a base station for use in the method.

In accordance with an aspect of the present invention, there is provided a mobile telecommunication system in which a base station communicates with a mobile station under the jurisdiction thereof in a radio zone in accordance with a multiple frame of a plurality of frames having a block of down-link signal slots and a block of up-link signal slots, and in which, in order that each base station selects a down-link control-channel slot to be used in its own base station, the base station previously stores therein the presence or absence of detection of a control-channel signal carrier for each of the time slots of each multiple frame throughout a plurality of multiple frame periods, judges time slots at which the control-channel signal carrier was periodically detected at intervals of the multiple frame period as down-link control-channel slots being used by other base stations, judges time slots at which the control-channel signal carrier was non-periodically detected as up-link control-channel slots being used by other base stations, and selects down- and up-link control-channel slots to be used in its own base station from the time slots other than the down-link control-channel slots being used by other base stations.

In the present invention, more in detail, each base station, on the basis of the detection status of the control-channel signal carrier, extracts as an "idle slot block" a slot block interposed between the down-link control-channel slots being used by other base stations. The "idle slot block" includes up-link control-channel slots and slots of no detection of the control-channel signal carrier. In each idle slot block, since the idle slots located at the corresponding up-link signal time slots of the multiple frame format of its own base station cannot be used as down-link signal slots, they are not selected as candidates for the down-link control-channel slot. The "down-link control-channel slot candidates to be used in its own base station" are selected from the remaining time slots located at the farthermost positions with respect to time from the down-link control-channel slots being used by other base stations. Such operations are carried out over the respective idle slot blocks and one of the down-link control-channel slot candidates having the highest (or lowest) evaluation value is determined as the down-link control-channel slot to be used in its own base station. In this connection, the selection of the down-link control-channel of its own base station from the idle slots is carried out with use of a predetermined evaluation function. When it is desired to determine the down-link control-channel slot from a plurality of candidate slots representative of the respective idle slot blocks, the specific slot is selected as the down-link control-channel slot of its own base station in accordance with the magnitudes of the evaluation values found by the evaluation function.

In accordance with another aspect of the present invention, there is provided a base station which comprises a R.F. block for performing its signal transmitting/receiving operation based on a TDMA-TDD type of multiple frame, a signal detection/discrimination block for detecting the level of a control-channel signal carrier received from an antenna and discriminating whether or not each slot is a control-channel slot being used by other base stations, a memory for storing therein detection data indicative of the detection/ discrimination results of the above signal throughout a plurality of multiple frame periods, and a processor for executing a transmission slot assignment processing program which analyzes the detection data, divides the slots of the multiple frame into down-link control-channel slots being used by other base stations and idle slots having up-link control-channel slots or slots of no detection of the control-channel signal carrier, and selects a down-link control-channel slot to be used in its own base station from ones of the idle slots other than the up-link signal slots of the multiple frame of its own base station on the basis of a predetermined evaluation function; and wherein the base station at its start-up time selects one down-link control-channel slot of the specific frame of the multiple frame to be used in its own base station through the signal discrimination block and transmission slot assignment processing program, transmits in its operational mode the down-link control-channel signal at the specific down-link slot of the specific frame of each multiple frame, specifies, as the up-link control-channel slot of its own base station, one of the up-link slots of each frame located at a corresponding position correlated with the down-link control-channel specific slot of its own base station, selects slots other than the control-channel slots as communication slots or traffic channel slots among the up-link and down-link slots of each frame, and performs communication of control and data information with a mobile station under the jurisdiction thereof with the traffic channel slots.

In the present invention, each base station can detect the presence or absence of the control-channel signal carrier for each slot throughout a plurality of multiple frame periods, can examine whether or not a slot including the control-channel signal carrier is periodically issued at intervals of the multiple frame period, and can thereby discriminate between the up-link and down-link control-channel slots being used by other base stations. Further, since the down-link control-channel slot to be used in its own base station is selected from the idle slots other than the down-link control-channel slots being used by other base stations and the up-link signal slots of the frames of its own base station, the selecting operation can be efficiently carried out.

Further, when it is desired to select the down-link control-channel slot candidates to be used in its own base station from the aforementioned idle slots, a previously-prepared evaluation function is applied to select ones of the idle slots located farthermost with respect to time from the down-link control-channel slots being used by other base stations and located before or after it and to select one of the selected idle slots in accordance with the evaluation values. Thus, even when the base station fails to establish frame synchronousness with other base stations, the base station can select the time slot with less possibility of control-channel signal interference as the transmission slot.

In the present invention, one of the slots at which the control-channel signal carrier was detected is judged as the up-link control-channel slot and regarded as an idle slot as in the slots at which the control-channel signal carrier was not detected, the down-link control-channel slot is selected from the idle slots interposed between the down-link control-channel slots being used by other base stations, whereby the efficiency of using the down-link control-channel slot can be increased and thus a high-density array of base stations can be realized.

In the present invention, there is used a multiple frame which includes a down-link control-channel slot for periodic transmission of a control-channel signal at intervals of a predetermined period, an up-link control-channel slot for non-periodic transmission of a control-channel signal and up- and down-link traffic-channel slots without the control-channel signal; the reception status of the control-channel signal carrier is observed throughout a plurality of multiple frame periods to discriminate between the down- and up-link control-channel slots being used, to extract slots interposed between the down-link control-channel slots being used by other base stations as idle slots, to select ones of the extracted idle slots other than the up-link signal slots of the multiple frame of its own base station as the down-link control-channel slot candidates to be used in its own base station, and to select, as the down-link control-channel slot of its own base station, one of a plurality of candidate slots representative of the slots located farthermost with respect to time from the down-link control-channel slots being used by other base stations. As a result, even when the base station fails to establish frame synchronousness with other base stations, the base station can assign the control slots with causing less interference with other base stations.

DETAILED DESCRIPTION

An embodiment of the present invention will be explained with reference to the accompanying drawings.

Figure 2:
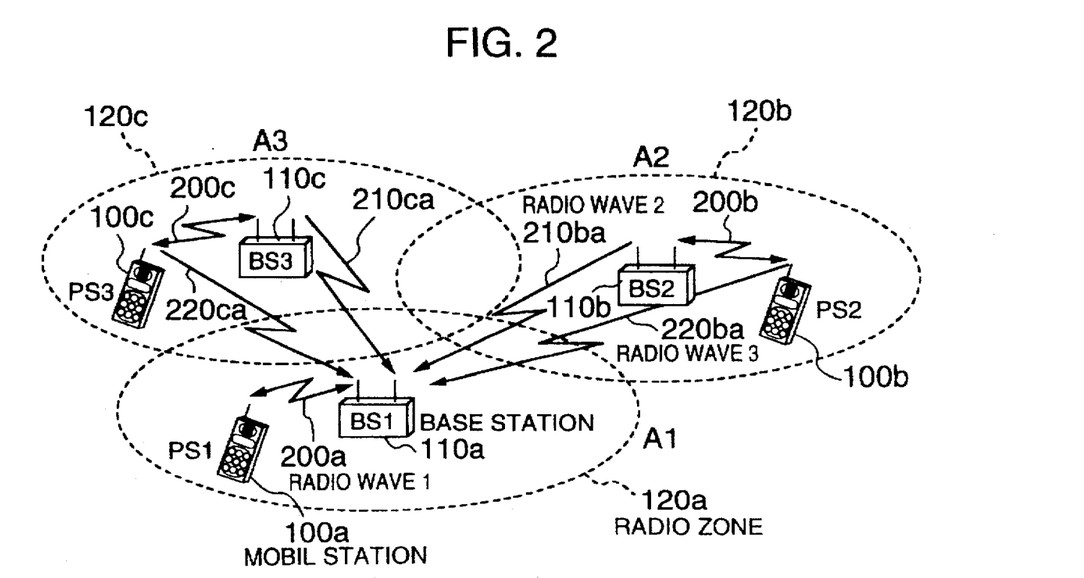
FIG. 2 is a diagram for schematically explaining spatial radio zones in a mobile telecommunication network.

Referring to FIG. 2, there is shown a diagram showing an arrangement of a mobile telecommunication system to which the present invention is applied and also for explaining radio transmission in spatial radio zones. The system of FIG. 2 includes base stations (BSs) 110 (or 110a to 110c), mobile stations 100 (or 100a to 100c), radio zones 120 (or 120a to 120c) in which the respective base stations 110 can communicate with the associated mobile stations 100, each of the mobile stations being able to communicate with the other mobile stations or fixed terminals via the associated base station. In the illustrated example, for the purpose of simplifying the drawing, a network in which the fixed and base stations are mutually interconnected is omitted.

The respective base stations 110 and mobile stations in the radio zones 120 perform signal transmitting/receiving operations on the time division multiple access/time division duplex (TDMA-TDD) basis using radio waves 200 (or 200a to 200c). Although one of the mobile stations is illustrated in one of the radio zones in the drawing, each of the base stations can communicate with a plurality of mobile stations located within the associated radio zone by utilizing a plurality of communication time-slots for traffic channel within each frame.

In the present embodiment, in each radio zone 120, a multiple frame made up of a plurality of frames is used, a control channel signal carrier (frequency) of a specific frequency common to the other radio zones is employed for communication of control information between the base station and mobile station or stations, and one frequency selected from predetermined traffic channel carriers of a plurality of channels is assigned to each one of the stations for communication of speech information between the base station and mobile station or stations. In this connection, it is unnecessary to always establish synchronism between the signal transmission/reception timing within the above frames and that of the other base stations.

When a plurality of radio zones 120 are located close to each other, a radio wave transmitted from the base station 110 and a radio wave transmitted from the mobile station 100 in one radio zone arrive at the adjacent other radio zone as interference radio waves. In the illustrated example, a radio wave 210ba emitted from the base station (BS2) 110b and a radio wave 210ca emitted from the base station (BS3) 110c arrive at the base station (BS1) 110a as an interference radio wave (radio wave 2). Likewise, a radio wave 220ba emitted from the mobile station (PS2) 100b and a radio wave 220ca emitted from the mobile station (PS3) 100c arrive at the base station 110a as an interference radio wave (radio wave 3).

When attention is paid to the control channel signal carrier (frequency) for common use of the plurality of radio zones, the radio waves 2 and 3 emitted in the other radio zone, in addition to an essential radio wave (radio wave 1) transferred between the base and mobile stations in the zone, arrive at the base station 110a. For this reason, when these radio waves are overlapped in the timing (control channel time-slot) of transmitting/receiving timing of the control channel signal carrier, interference occurs among these waves.

Figure 3:
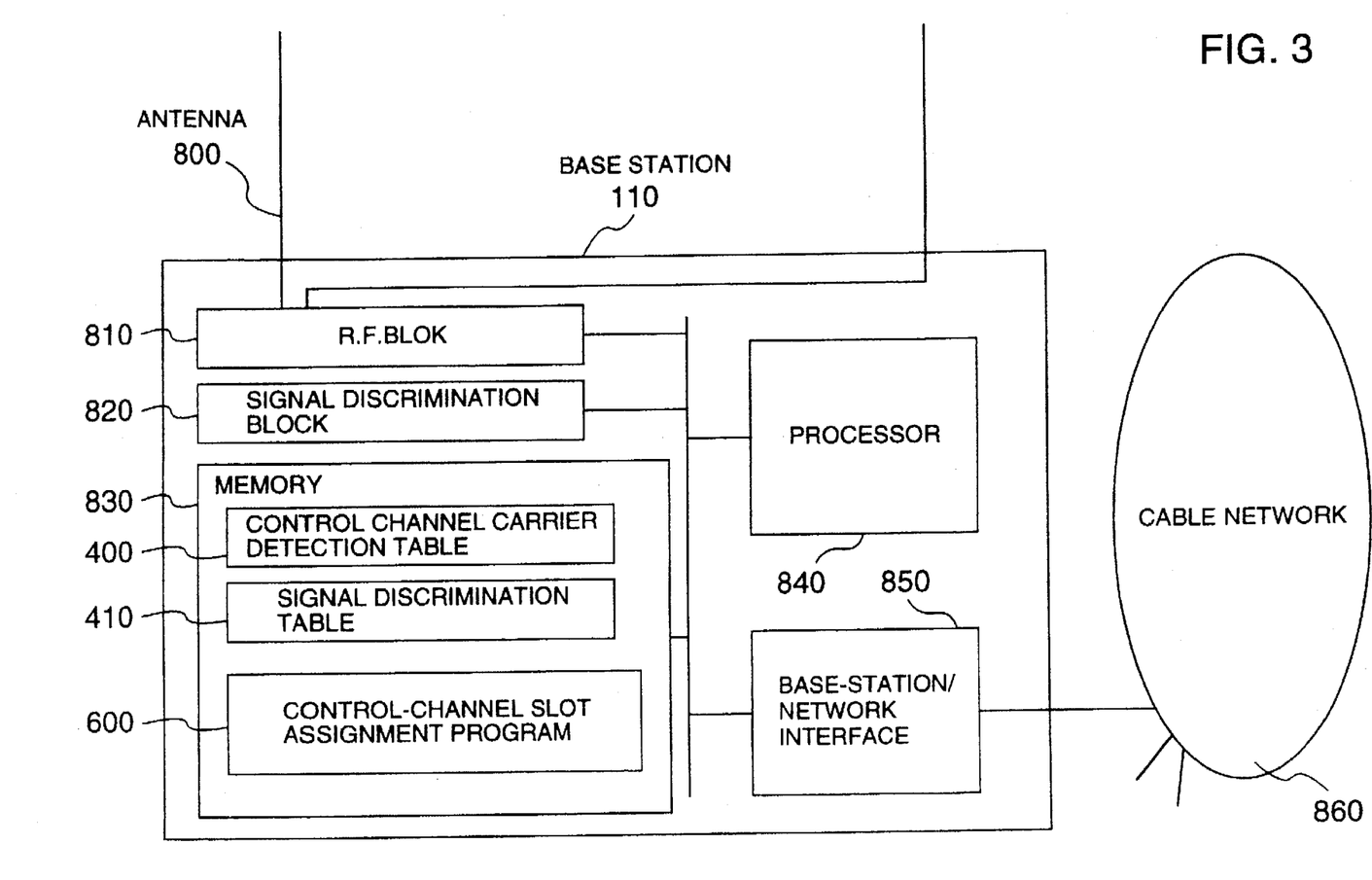
FIG. 3 is a block diagram of an arrangement of a base station in the present invention.

Shown in FIG. 3 is a structure of the base station 110. The illustrated base station 110 includes an antenna 800, an R.F. block 810 for receiving a signal carrier from mobile stations or other base stations or for transmitting a signal carrier from its own base station via the antenna 800, a signal discrimination block 820 for detecting and discriminating the received signal, a memory 830 for holding therein transmit/ receive data and program, a processor 840 for performing control operation including relay of the transmit/receive data in accordance with the program, and a base-station/network interface 850 for connection with a wired or cable network 860.

In the present invention, the control channel is represented by "C-ch".

Held within the above memory are a control channel carrier detection table 400 for storing therein the detected result of the control channel signal carrier, a signal discrimination table 410 for storing therein the discriminated result of a slot used to C-ch down-/up-link timing on other BSs (also referred to as a down-/up-link C-ch slot) judged based on the detected result of the control channel signal carrier, a slot assignment program 600 for selecting a down-link C-ch slot to be used by its own base station on the basis of the discriminated result of the control channel time-slot, and other program and data.

Figure 5:
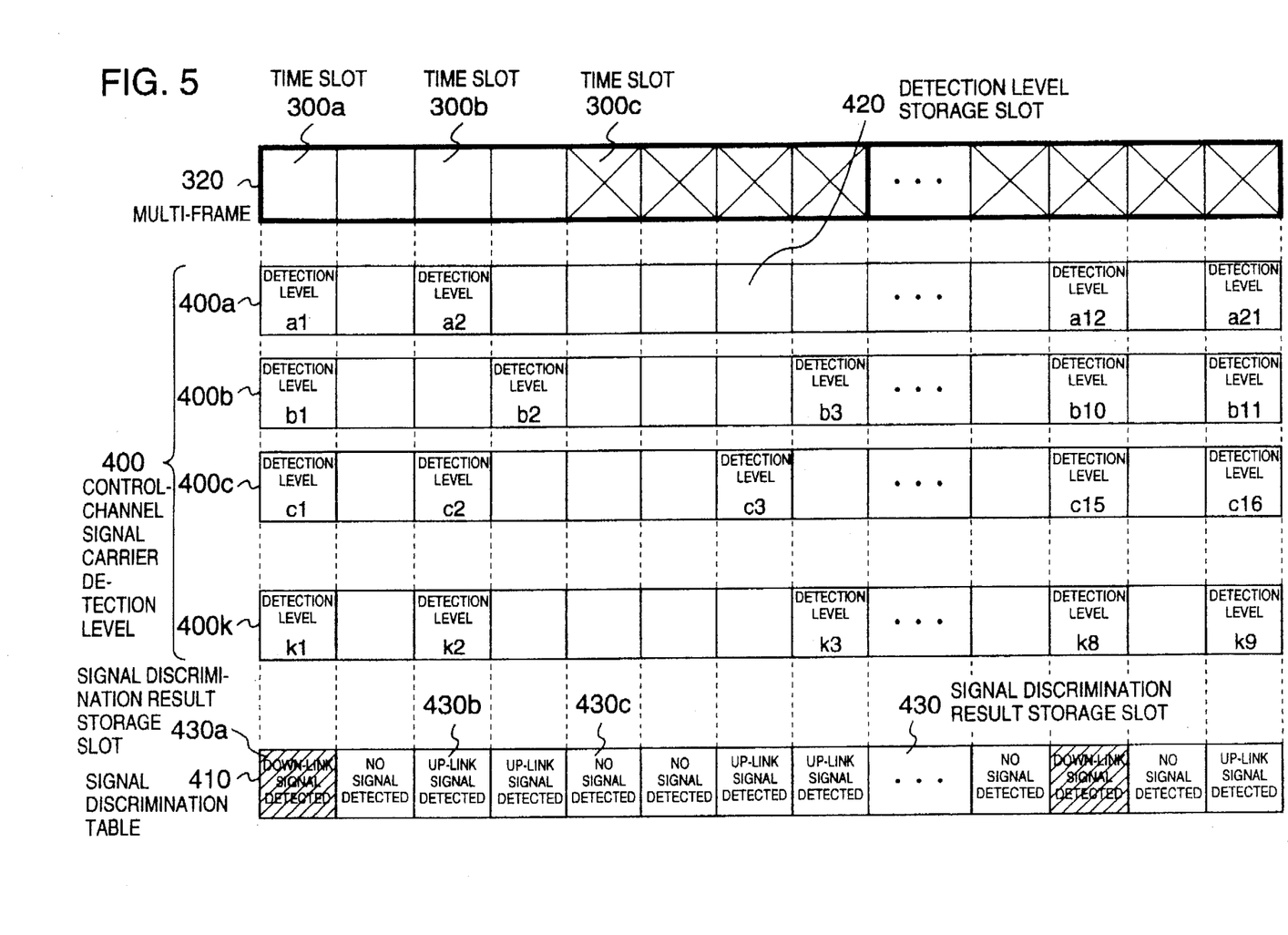
FIG. 5 shows structures of a control channel carrier detection table and a signal discrimination table.

More specifically, the above control-channel slot assignment is carried out as follows. Under the control of the processor 840, the R.F. block 810 receives an incoming control channel signal carrier from another base or mobile station, the signal discrimination block 820 creates data on the detection level values of the control channel signal carrier throughout duration of a plurality of multiple frames, and the control channel carrier detection table 400 stores the created data therein. And on the basis of the contents of the control channel signal carrier detection table, the slots of the multiple frames are divided into down-link C-ch slots (down-link signal detected) on other BSs, up-link C-ch slots (up-link signal detected) and C-ch carrier undetected slots (no signal detected); and the divided results are stored in the signal discrimination table 410, as shown in FIG. 5. When the above control channel signal discrimination operation is completed, the control-channel slot assignment program 600 is started to select a down-link C-ch slot to be used by its own base station by looking up the stored data of the signal discrimination table 410.

Figure 4:
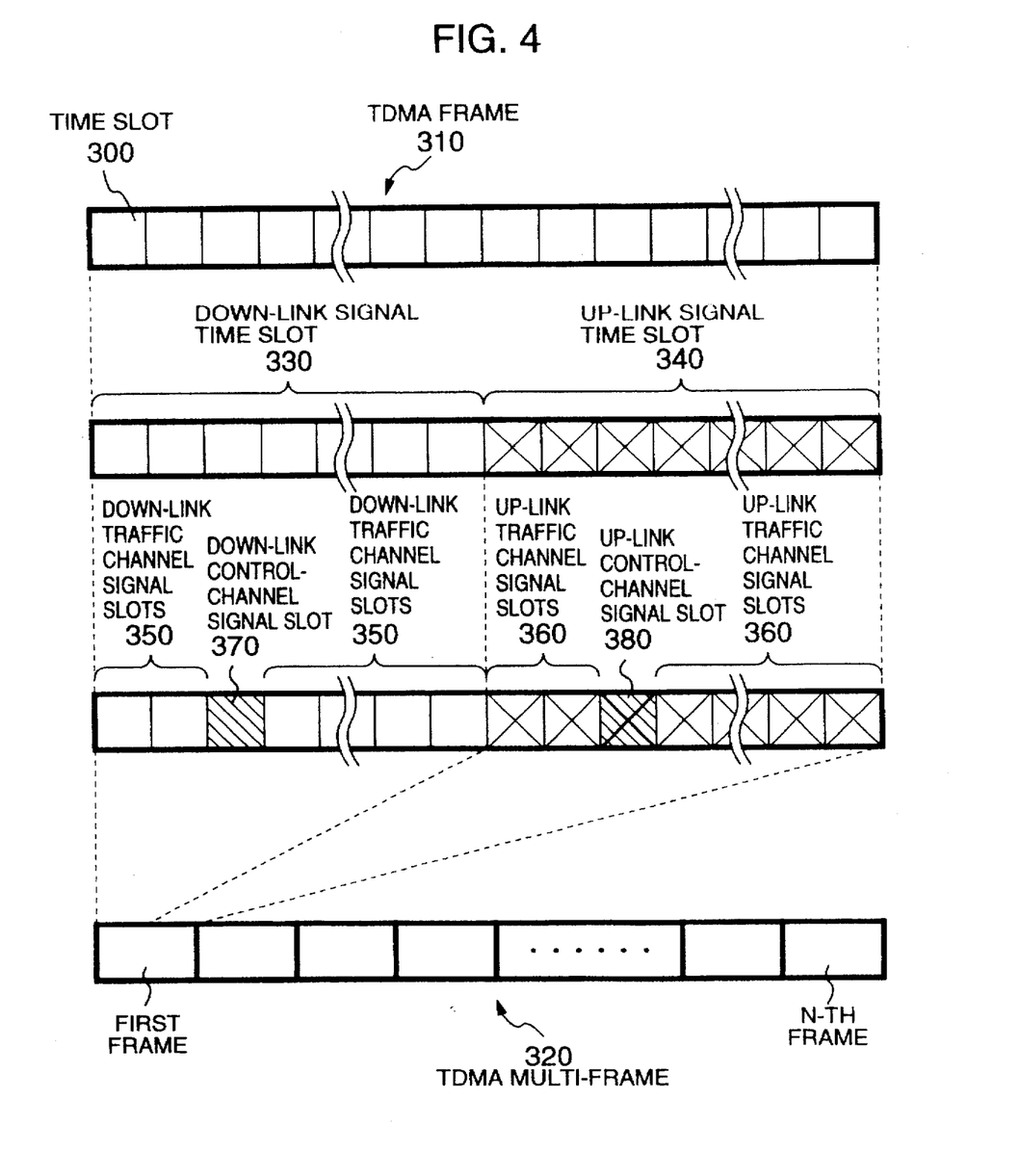
FIG. 4 shows structures of TDMA multiframes.

FIG. 4 shows a relationship among time slots employing the TDMA-TDD system, a TDMA frame and a TDMA multiple frame.

Each TDMA multiple frame 320 comprises a plurality of TDMA frames 310 (which will be referred merely as the frame, hereinafter). Each frame 310 includes a block of time slots 330 for down-link signals (to be transmitted from the base station 110 to the mobile station 100) and a block of time slots 340 for up-link signals (to be transmitted from the mobile station 100 to the base station 110) represented by "☒".

In accordance with the present invention, each base station selects idle one (specific slot) of down-link signal slots of any frame having the least interference possibility with other base stations and assigns the selected slot as down-link C-ch slot 370 used in its own base station. Transmission of a control channel signal directed from the base station to the mobile station under the jurisdiction thereof is periodically carried out at intervals of a multiple frame period with use of the above down-link C-ch slot. In other frames of the same multiple frame, at ones of the down-link signal slots of corresponding to the above specific slot, e.g., located at positions shifted by one frame period, the transmission of the down-link control channel signal is not carried out. In each frame 310, the remaining down-link signal time-slots other than the above specific slot is assigned as time slots 350 for traffic channel of down-link data information (which will be referred also as the down-link traffic-channel time-slots 350).

Meanwhile, one or ones of the up-link signal time slots 340 of each frame 310 is or are assigned as a up-link control-channel time slot or slots 380 for transmission of the control channel signal from the mobile station to the base station, whereas the remaining slots are assigned as slots 360 of traffic channel of up-link data information (which are also referred to as the up-link traffic-channel signal slots 360).

The up-link control-channel time slots 380 may be assigned to have a specific positional relationship with the down-link C-ch slot 370. For example, when the down-link slot corresponds to the i-th one of the down-link slots, the up-link control-channel time slot 380 is assigned as a slot located at position shifted by a half-frame time from the position of the down-link control-channel slot (specific slot) so that the i-th one of the up-link control-channel slots corresponds to the up-link control-channel slot.

Each base station, after one slot is assigned as its own down-link control-channel slot thereto, repeats its periodic transmitting operations of the control channel signal at intervals of the TDMA multiple frame period. Accordingly, when the control channel signal carrier is detected at the i-th one of the down-link slots of the j-th frame of a TDMA multiple frame, the control channel signal carrier will be periodically detected at the i-th down-link slot of the j-th frame in the subsequent TDMA multiple frame. Each mobile station, on the other hand, performs its transmitting operation of up-link control-channel signal at unregular intervals as necessary. Accordingly, even when the control-channel signal carrier is detected at the k-th one of the up-link signal slots of the j-th frame of a TDMA multiple frame, the control-channel signal carrier is not always detected at the same k-th time slot of the next TDMA multiple frame.

FIG. 5 shows a relationship between the time slots of the TDMA multiple frame 320 generated at each base station and a table for holding/collecting detected results of the control-channel signal carrier in accordance with the present invention.

Figure 6:
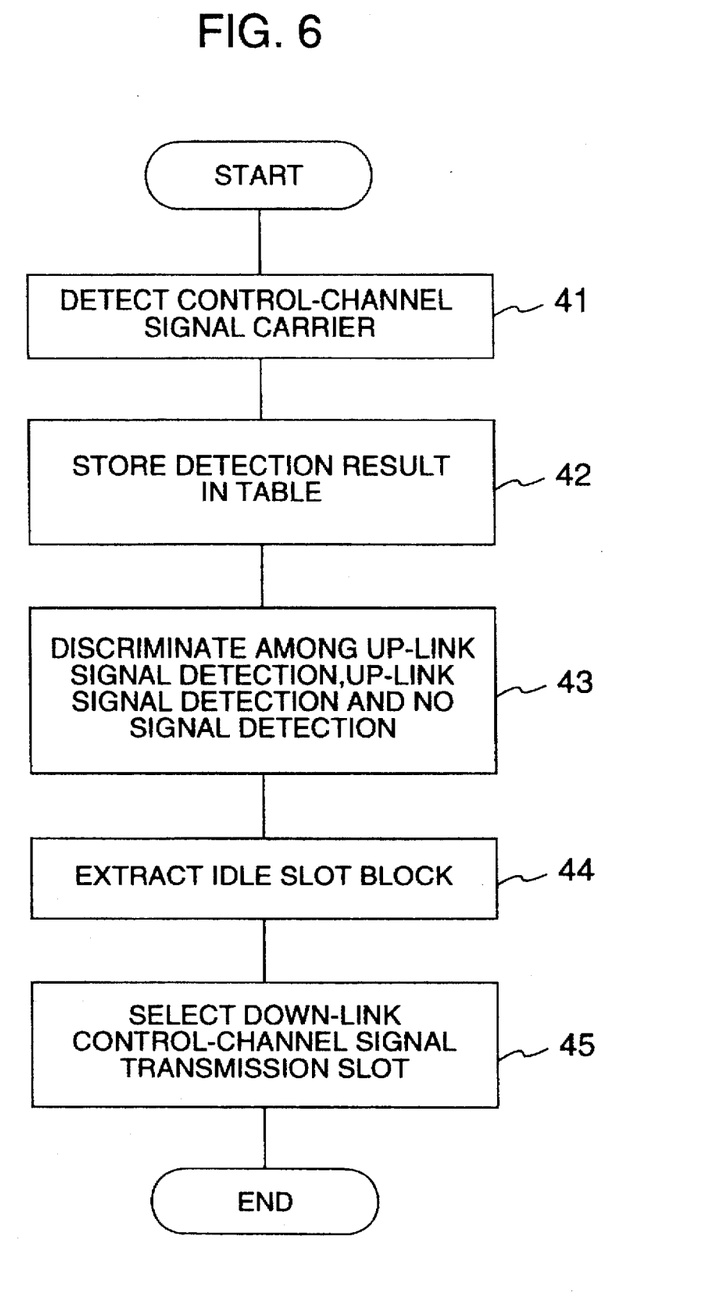
FIG. 6 is a flowchart for explaining how to select control-channel signal transmission slots.

FIG. 6 is a flowchart for explaining how to select a slot for transmission of the down-link control-channel signal.

In the present invention, each base station detects the control-channel signal carrier received at the antenna at the timing of each time slot in the TDMA multiple frame 320 of its own base station (step 41). Each base station stores the detection results (detection level values) of the control-channel signal carrier carried out at the respective time slots of the TDMA multiple frame 320 in the control channel carrier detection table 400 having the same number of detection level storage slots (memory area) 420 as these time slots (step 42). In the detecting operation of the control-channel signal carrier, the level of the external control-channel signal carrier (radio wave 1, 2 or 3 in FIG. 2) received from the antenna is measured at the detection timing corresponding to each time slot of the TDMA multiple frame.

In the present invention, the above control-channel signal carrier detecting operation is carried out with respect to a plurality (k) of consecutive TDMA multiple frames to create a plurality (k) of control channel carrier detection tables 400a to 400k corresponding in number to the respective TDMA-multiple frames. Thereafter, the data of these control-channel signal carrier detection tables are analyzed, and the number of time slots each having a level of control channel signal carrier equal to or over a predetermined level is counted among the k time slots (e.g., the i-th slots of the respective TDMA frames) located at the mutually corresponding same positions. When the control-channel signal carrier is detected at all the k time slots, it is judged that the slots are the down-link control-channel slots already being used by other base stations, and a discrimination data indicative of "down-link control-channel slots already being used by other base stations (down-link signal detected)" is set in discrimination result storage slots 430 of an i-th area of the signal discrimination table 410. When the detection frequency of the control-channel signal carrier is one or larger and smaller than k, the slots are judged as up-link control-channel slots and a discrimination data indicative of "up-link control-channel slots already being used by other base stations (up-link signal detected)" is set in the above i-th area of the signal discrimination table 410.

When the detection frequency of the control-channel signal carrier is zero, a discrimination data indicative of "no signal detected" is set in the i-th area of the signal discrimination table 410 (step 43).

In the example of FIG. 5, since the control-channel signal carrier is detected at time slots 300a of all the k frames, the discrimination data indicative of "down-link signal detected" are stored in the corresponding discrimination result storage slots 430a of the signal discrimination table 410. Since the control-channel signal carrier is not detected at time slots 300b of all the k frames in the control channel carrier detection table 400b, the discrimination data indicative of "up-link signal detected" are stored in the corresponding discrimination result storage slots 430b of the signal discrimination table 410. Since the control-channel signal carrier is not detected at time slots 300c of all the k frames, discrimination data indicative of "no signal detected" are stored in the corresponding discrimination result storage slots 430c of the signal discrimination table 410.

Although the discrimination data have been set in the signal discrimination table 410 with the time slots divided into 3 types for the convenience of traffic analysis in the present embodiment, it is sufficient merely to divide the time slots into 2 types of "down-link control-channel slots being used by other base stations" and "other slots" in an embodiment to be explained in the following. Further, the down-link signal cannot be always detected at the down-link control-channel slots being used by other base stations in all the k TDMA frames subjected to the detecting operation of the control-channel signal due to the radio wave transmission characteristics, the environment surrounding the base stations, etc. For this reason, a threshold value smaller than k may be previously set so that the detection frequency of the control-channel signal carrier is compared with the threshold value to judge whether to be the down- or up-link control-channel slot.

Figure 7:
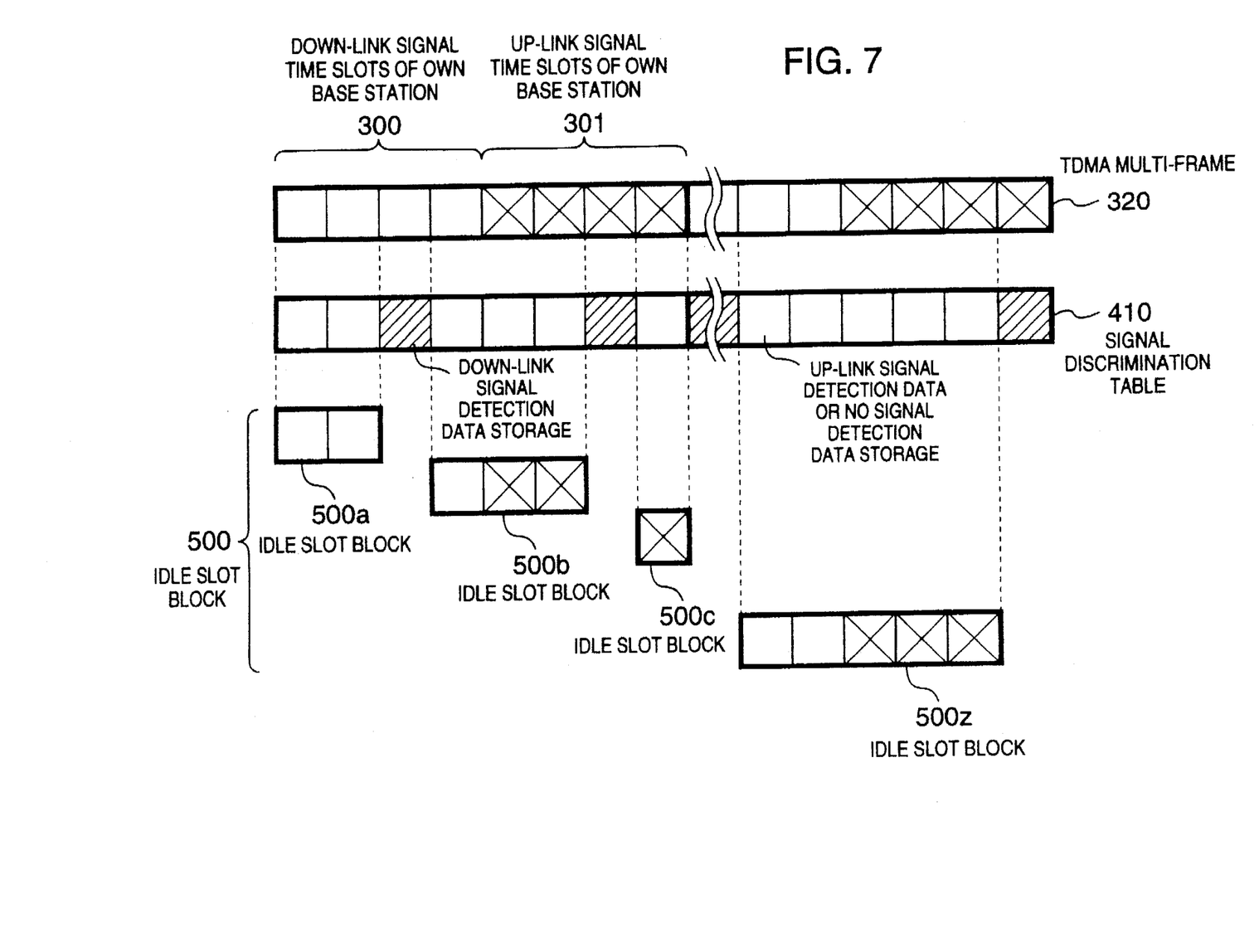
FIG. 7 shows structures of blocks of idle slots.

FIG. 7 shows a relationship among the TDMA multiple frame 320, signal discrimination table 410 for holding the discrimination data of the control-channel signals therein, and a block of idle slots 500 (idle slot block 500) for use in judgement of the down-link control-channel slots of its own base station.

The signal discrimination table 410 holds the discrimination results of slots when the detection of the control-channel signal carrier was carried out at the timing corresponding to each time slot of the TDMA multiple frame. In the signal discrimination table 410, slots other than the slots (marked by "////") of "down-link signal detected" already being used by other base stations can be defined as the idle slot blocks 500 each in the form of a continuous area indicative of "up-link signal detected" or "down-link signal detected". The idle slot block is extracted in the step 44 of FIG. 6.

A plurality of such idle slot blocks are present in the signal discrimination table 410. When the time slots of each of the idle slot blocks are made to be associated with the TDMA multiple frame 320 of its own base station each frame having a block 301 of up-link signal time slots (up-link signal time slot block 301) and a block 300 of down-link signal time slots ( down-link signal time slot block 300), a slot for one base station to transmit the control channel signal is any one of the down-link signal time slots of the block 300. In the present invention, ones of the idle slots of the block 500 corresponding to the up-link signal time slots of the multiple frame of its own base station and marked by "x" are not selected as the down-link control-channel slot.

Figure 8:
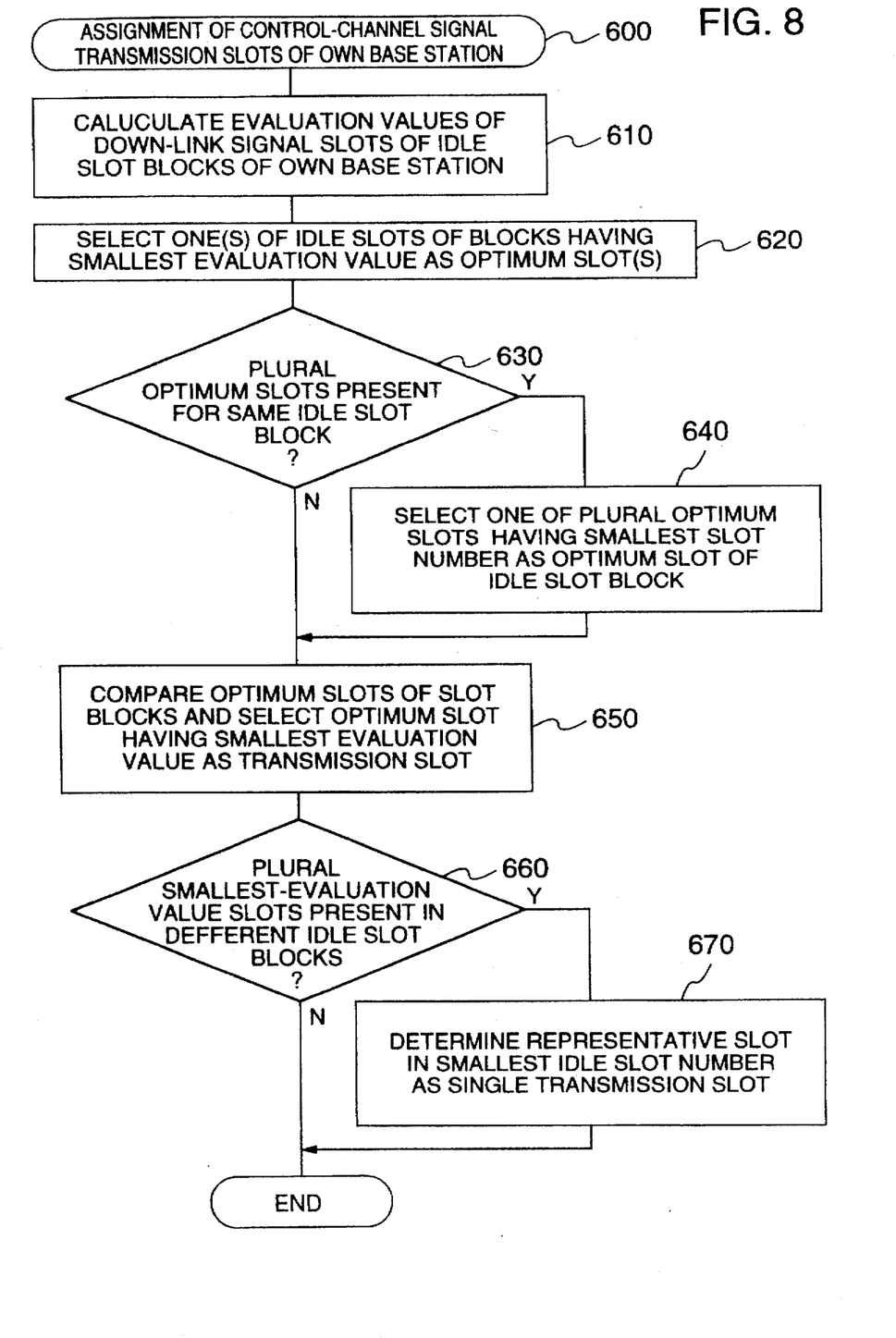
FIG. 8 is a flowchart for explaining the assigning operation of control-channel signal transmission slots.

Turning now to FIG. 8, there is shown a flowchart of details of the step 45 in FIG. 6 for explaining the control-channel slot assigning operation to determine one of the above plurality of idle slot blocks 500 as the control-channel signal slot of its own base station.

First of all, in each of the idle slot blocks 500 in the signal discrimination table 410, the respective down-link time slots of its own base station are subjected to calculation of evaluation values with use of a predetermined evaluation function (step 610). The evaluation value is a value indicative of the magnitude of a time difference of the target slot from the down-link C-ch slot being used by other base stations, that is, from the down-link signal detection data storage slot which locates adjacent to the head or tail of the idle slot block including the target slot. As to the evaluation function, such a function that, for example, the larger the time difference between the above down-link signal time slot and the down-link control-channel detection data storage slot adjacent to the above idle slot block, the smaller the evaluation value is, is applied, so that one of the slots having the smallest evaluation value is determined as an optimum idle slot candidate representative of the idle slot blocks (step 620).

If a plurality of such optimum idle slot candidates having the identical evaluation value are present in the same idle slot block (step 630), then one of the optimum slot candidates, e.g., having the smallest of local slot numbers numbered in one idle slot block is used as a representative of the block (step 640). Then, one of the optimum idle slot candidates selected from the plurality of idle slot blocks having the smallest evaluation value is used as the control-channel signal slot of its own base station (step 650). When a plurality of slots having the same and smallest evaluation value are present (step 660), one of the idle slots having the smallest of the idle slot block numbers is selected as the control-channel signal slot of its own base station (step 670). In the specific frame secured within the TDMA multiple frame, the down- and up-link control-channel time slots are determined on the basis of the position of the control-channel signal slot determined through the above operations, while the remaining up- and down-link slots are assigned as the traffic channel time slots.

Figure 9:
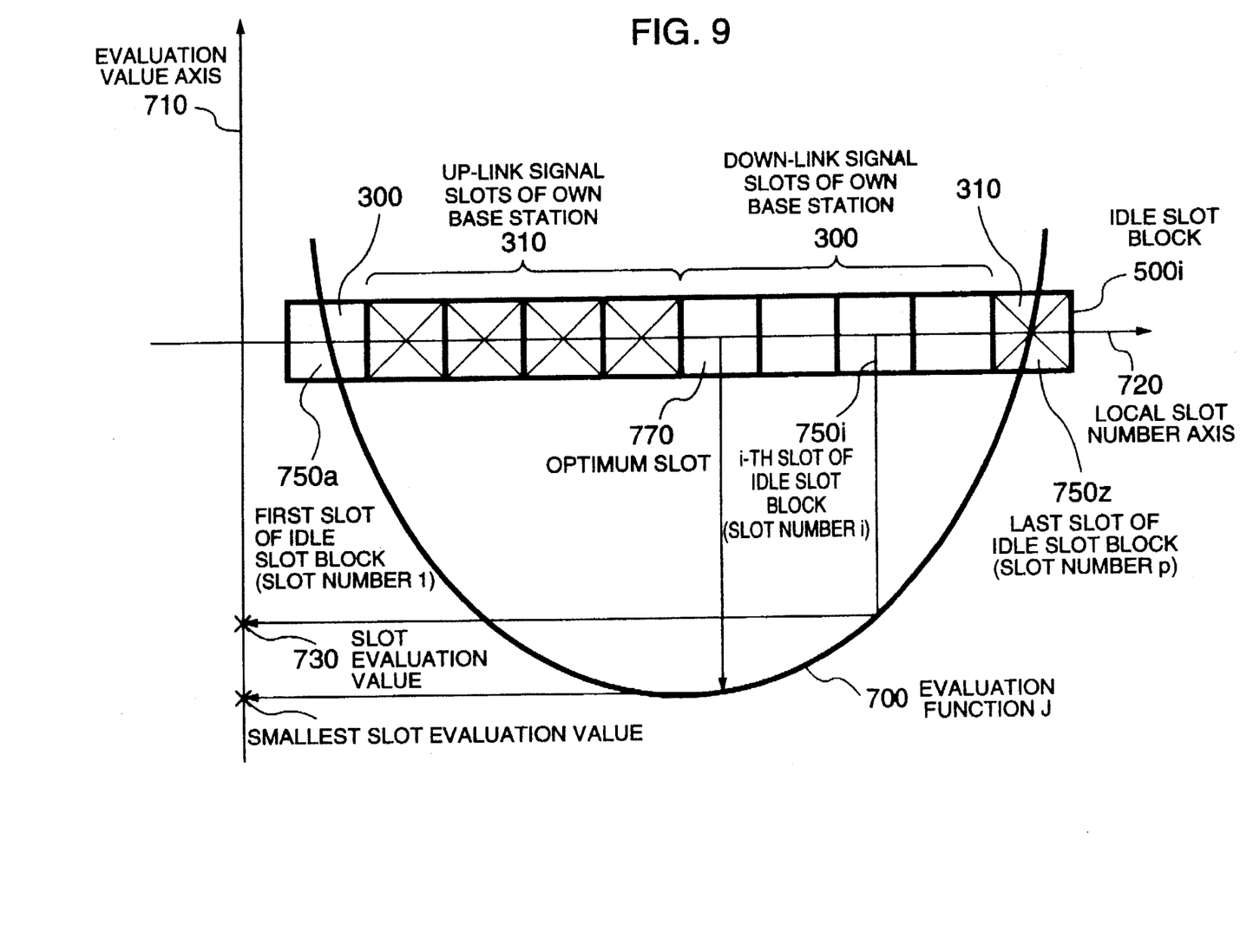
FIG. 9 shows an embodiment of an evaluation function for use in selection of control-channel transmission slots.

FIG. 9 is an example of relationship between the evaluation value and evaluation function for use in determining control-channel slot candidates in the respective idle slot blocks. It is assumed that one 500i of the idle slots in FIG. 7 was extracted as shown in FIG. 8. It is also assumed that a first slot 750a has a local slot number of "1", a second slot has a local slot number of "2", ... and a last slot 750z has a local slot number of "p" in this order. Assuming further that the total number of idle slots included in the idle slot block is "p" and any one of the slots has a local slot number of "i", then the value of the evaluation function J (700) of the slot i is given, e.g., as J=(i−1)(i−p). That is, an evaluation value 730 of one 750i of the idle slots is obtained by substituting the slot number i into the evaluation function. Ones of the slots included in the respective idle slot blocks and corresponding to the down-link signal slots of its own base station are all subjected to calculation of evaluation values in accordance with the above evaluation function, and ones of the slots having the smallest evaluation values in the idle slot blocks are selected as optimum slot candidates 770 for the respective idle slot blocks. One of such optimum slot candidates having the smallest evaluation value is selected as the down-link control-channel slot.

The evaluation function J may be such a function that one of the down-link signal slots farthermost (with respect to time) from the down-link control-channel signal being used by other base stations has the largest evaluation value. In this case, ones of the idle slots of the blocks having their largest evaluation values are selected as down-link control-channel signal transmission slot candidates.

It will be appreciated that the present invention is not limited to the specific embodiments disclosed herein but the invention cover all modifications falling within the spirit and scope of the invention as defined in the appended claims.

What is claimed is:

1. A slot assignment method for a control channel signal in a mobile telecommunication system which includes a plurality of base stations each having at least one mobile station wherein communications between the base station and the associated mobile stations are carried out in accordance with a multiple frame sequence of a plurality of frames each including a block of down-link signal slots and a block of up-link signal slots and communication of control channel information between each base station and the associated mobile station is carried out based on a control-channel signal carrier of a same frequency as the other base stations, said method comprising the steps of:

monitoring, in each of the base stations, a reception status of the control-channel signal carrier of said specific frequency during a plurality of multiple frame periods;

judging a time slot including said control-channel signal carrier periodically detected at intervals of the multiple frame period as a down-link control-channel slot being used by the other base station; and assigning one of the slots other than said down-link control-channel slot used by the other base stations as a down-link control-channel slot to be used in its own base station in the multiple frame of its own base station, said assigning step includes the steps of:

assigning, as the down-link control-channel slot to be used in its own base station, one of the remaining slots other than the slots belonging to a block of up-link signal slots of the multiple frame of its own base stations; and selecting, as the down-link control-channel slot to be used in its own base station, one of the remaining slots located with respect to time farthermost from said down-link control-channel slot being used by the other base stations.

2. The slot arrangement method for a control channel signal as set forth in claim 1, wherein said step of assigning said down-link control-channel slot includes the steps of:

extracting, as an idle slot block, slots other than said down-link control-channel slot being used by the other base stations in the multiple frame sequence of its own base station;

applying a predetermined evaluation function to said idle slot blocks to find an evaluation value as a selection reference; and selecting the down-link control-channel slot to be used in its own base station on the basis of the evaluation value.

3. The slot assignment method for a control channel signal as set forth in claim 2, wherein said step of applying a predetermined evaluation function includes the step of applying an evaluation function of J=(i−1)(i−p) to find said evaluation value when a head, a last and a judgement-target slot of said idle slot block have slot values "1", "p" and "i" respectively; and said step of selecting the down-link control-channel slot further includes the step of selecting, as the down-link control-channel slot used in its own base station, one of the slots having the smallest one of said evaluation values found for the idle slot blocks.

4. The slot assignment method for a control channel signal as set forth in claim 2, wherein said step of applying a predetermined evaluation function includes the step of:

selecting a slot candidate of a plurality of slots located in the same idle slot block, which can be selected as the down-link control-channel slot candidates to be used in its own base station and which has the same evaluation value, wherein said step of selecting one of said slot candidates as a candidate slot is based on a magnitude relationship between slot numbers attached to the respective slots of said idle slot block; and said step of selecting the down-link control-channel slot to be used in its own base station includes the step of selecting one of said candidate slots of the plurality of candidate slots which can be selected as the down-link control-channel slots to be used in its own base station and which has the same evaluation value in said candidate slots selected from the idle slot blocks, wherein selecting one of said candidate slots as the down-link control-channel slot is used in its own base station on the basis of a magnitude relationship between slot numbers attached to the respective slots of said idle slot block.

5. In a mobile telecommunications systems which includes a plurality of base stations each having at least one mobile station and in which communication between the base station and the associated mobile stations is carried out in accordance with a multiple frame sequence of a plurality of frames each including a block of down-link signal slots and a block of up-link signal slots and communication of control channel information between each base station and the mobile station under jurisdiction thereof is carried out based on a control-channel signal carrier of a same specific frequency as the other base stations, each of said base stations comprising;

means for monitoring, in each of the base stations, a reception status of the control-channel signal carrier of said specific frequency during a plurality of multiple frame periods;

means for judging a time slot including said control-channel signal carrier periodically detected at intervals of the multiple frame period as a down-link control-channel slot being used by the other base station, and creating a table showing use statutes of the time slots of the multiple frames by other base stations; and means for assigning, by looking up said table, one of the slots other than said down-link control-channel slots being used by the other base stations as a down-link control-channel slot to be used in its own base station in the multiple frame of its own base station, said means for assigning said down-link control-channel slot includes:

means for assigning, as the down-link control-channel slot to be used in its own base station, one of the remaining slots other than the slots belonging to a block of up-link signal slots of the multiple frame of its own base station; and means for selecting, as the down-link control-channel to be used in its own base station, one of the remaining slots located with respect to time, farthermost from said down-link control-channel slot being used by other the base stations.

6. The base station as set forth in claims 5, wherein said means for assigning said down-link control-channel slot includes:

means for extracting, as an idle slot block, the slots other than said down-link control-channel slot used by the other base stations in the multiple frame sequence of its own base station;

means for applying a predetermined evaluation function to said idle slot blocks to find an evaluation value as a selection reference; and means for selecting the down-link control-channel slot used in its own base station on the basis of the evaluation value.

7. The base station as set forth in claim 6, wherein said means for applying a predetermined evaluation function includes means for applying an evaluation function of $J=(i-1)(i-p)$ to find said evaluation value when a head, a last and a judgement-target slot of said idle slot block have slot values of "1", "p" and "i" respectively, and said means for selecting the down-link control-channel slot includes means for selecting, as the down-link control-channel slot to be used in its own base station, one of the slots having the smallest one of said evaluation values found for the idle slot blocks.

8. The base station as set forth in claim 6, wherein said means for applying a predetermined evaluation function includes means for selecting a slot candidate when there are, in the same idle slot block, a plurality of slots which can be selected as the down-link control-channel slot candidates to be used in its own base station and which has the same evaluation value, said selecting means selects one of said slot candidates as a candidate slot on the basis of a magnitude relationship between slot numbers attached to the respective slots of said idle slot block, and said means for selecting the down-link control-channel slot to be used in its own base station includes means for, where there are a plurality of candidate slots which can be selected as the down-link control-channel slots to be used in its own base station and which has the same evaluation value in said candidate slots selected from the idle slot blocks, selecting one of said candidate slots as the down-link control-channel slot to be used in its own base station on the basis of a magnitude relationship between slot numbers attached to the respective slots of said idle slot block.

* * * * *